Oct. 31, 1950     J. E. OSLUND     2,527,758
DIE GAUGE
Filed Dec. 10, 1946

INVENTOR.
JOHN E. OSLUND.
BY
Louis V. Lucia
ATTORNEY.

Patented Oct. 31, 1950

2,527,758

UNITED STATES PATENT OFFICE 2,527,758

DIE GAUGE

John E. Oslund, Weathersfield, Conn.

Application December 10, 1946, Serial No. 715,176

2 Claims. (Cl. 33—75)

This invention relates to die gages such as used for gaging angles on dies or the like and more particularly gaging the angles of die walls.

An object of this invention, among others, is to provide an improved gage employing an arm which can be inserted into a small, as well as a larger, opening, such as in blanking dies or the like for measuring the angularity of the walls of said openings.

A further object of the invention is to provide a small, compact and easily manageable gage which can be easily adjusted and by means of which the angle of a wall in a hole, or at a side of a die may be quickly and accurately gaged or measured.

A further object of the invention is to provide a clamp on said gage into which may be placed differently shaped rods, making the use of my improved gage possible with dies of any shape and in holes of any size.

Further objects and advantages of this invention will be more clearly understood from the following description and from the accompanying drawings, in which—

Figure 1:
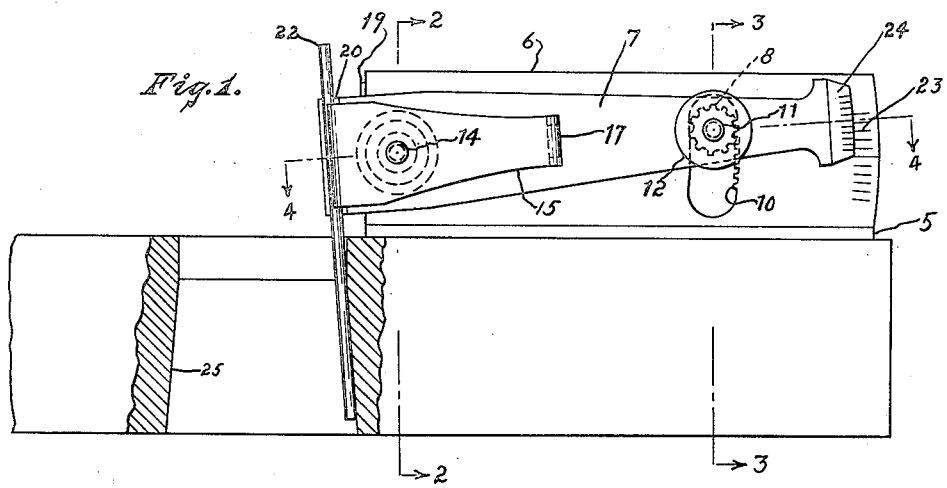
Fig. 1 is a side elevational view of my improved gage as used in gaging or measuring an angle in an opening of a die member.
Figure 2:
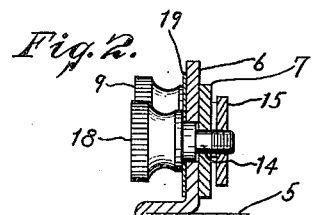
Fig. 2 is an end view, in vertical section, on line 2—2 of Fig. 1.
Figure 3:
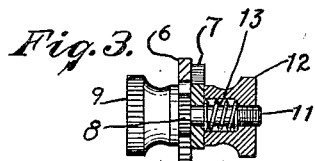
Fig. 3 is a similar view on line 3—3 of Fig. 1.
Figure 4:
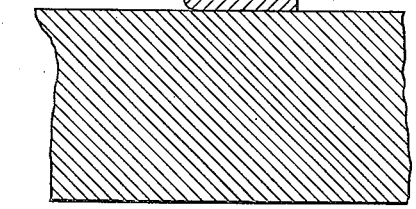
Fig. 4 is a sectional plan view, on line 4—4 of Fig. 1.
Figure 4:
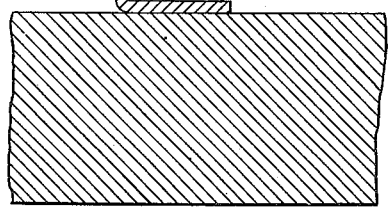
Figure 4:
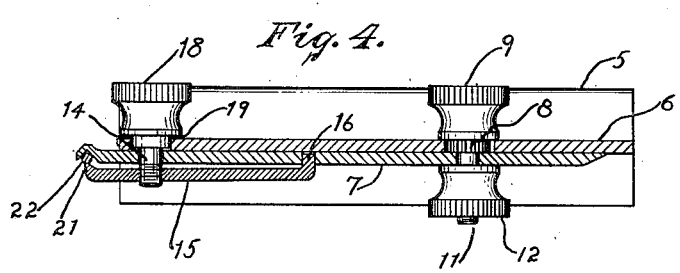

As shown in the drawings, my improved gage may comprise a base 5 having a vertical portion 6 on which is pivotally mounted a lever 7 which may be adjusted about its pivot by means of a gear 8 which may be rotated by means of a knob 9 and meshes with teeth 10 that are formed in a side of an opening in the vertical portion 6. The said gear is rotatably mounted on the lever 7 by means of a stud 11 that is threaded to a thumb nut 12 for clamping said lever in adjusted position. A spring 13 is provided within the said nut to retain the gear 8 and stud 11 in position when the nut is loosened and to prevent loss of said nut when not tightened against the lever 7.

The said lever 7 is pivoted to the portion 6 by means of a stud 14 which extends through the said portion and lever and is threaded to a clamping plate 15 that is retained against rotation on the lever 7 by means of a finger 16 that projects into an opening 17 in said lever.

The stud 14 has a knob 18 which bears against a leaf spring 19 that serves to retain said stud against free rotation when the clamp bar 15 is loosened. Adjacent to the end of the lever 7, there is provided a transverse groove 20 which co-operated with a flange 21, on the clamp plate, to secure a suitable gaging bar or rod 22 to said lever.

Radial graduations 23 are provided on the vertical portion 6 which co-operate with vernier graduations 24, on the bevelled end portion of the lever 7, to locate said lever for the gaging of desired angles.

In the use of my improved gage for gaging an angle, the same may be adjusted for a specified angle and placed upon the surface of a die, as illustrated, with the bar 22 in gaging position against an angular wall, as at 25. The accuracy of the angle of said wall may then be determined visually by noting the light which will show between the gaging bar and the surface being gaged, where inaccuracy exists in the angle of said surface and the said bar.

My gage may also be used for measuring angles by placing it in position relative to the surface which is to be measured and then rotating the gear 8 until the bar 22 is in proper contact with the said surface. The angularity of the surface may then be read on the scale provided by the graduations 23 and 24.

It will be noted that the rod 22 may be replaced with rods or bars of any desired length or shape, within the capacity of the clamping portion, and that such bars or rods will be securely retained at their adjusted angles when the lever 7 is tightened in its adjusted position.

I claim:

1. A gage of the character described comprising a base having an upright portion, a stud rotatable in said portion, a knob on said stud having a shoulder, a spring member between said upright portion and said shoulder, a lever pivotally mounted on said stud, a clamping plate threaded to said stud, a finger at one end of said plate having an abutment forming a rest for an end of said plate, and a projection on said finger extending into an opening in said lever for anchoring the plate thereto, cooperating clamping means at the opposite end of the plate and on said lever for clamping a bar therebetween by rotation of said stud, adjusting means rotatable in said lever comprising a gear rotatably carried on said lever and meshing with teeth in said upright portion, and clamping means for securing said lever in adjusted position.

2. A tool gage of the character described comprising a base of sheet metal having a vertically disposed plate thereon, a pivoting member including a stud rotatable in said vertical plate and extending therethrough, a lever pivoted to said plate by said stud, a clamping plate threaded to said stud and having a perpendicular extension at one end thereof forming a rest for said end and anchoring said plate to the lever against rotation, a flange projecting from said clamping plate, a groove adjacent to the end of the lever and in alignment with said flange for receiving a bar therebetween, a knob at the rear of said vertical plate for rotating said stud to operate said clamping plate into and out of clamping position, and means for adjusting said lever for positioning said bar at different angles relative to said base; said adjusting means including a stud rotatably carried on said lever, a gear on said stud extending into an opening on said vertical plate and meshing with teeth at one side of said opening, a knob for rotating said gear, a clamping screw threaded to said stud for clamping said lever into adjusted position on said vertical plate, and indicia on said vertical plate and lever for indicating the angle of said bar relative to the base.

JOHN E. OSLUND.

REFERENCES CITED

The following references are of record in the file of this patent:

UNITED STATES PATENTS

| Number | Name | Date |
|---|---|---|
| 330,538 | Woolsey | Nov. 17, 1885 |
| 511,746 | Bates | Jan. 2, 1894 |
| 613,814 | Benes | Nov. 8, 1898 |
| 654,370 | Wahrer | July 24, 1900 |
| 1,060,634 | Rosen | May 6, 1913 |
| 1,852,760 | Sisson | Apr. 5, 1932 |
| 2,208,476 | Selander | July 16, 1940 |

FOREIGN PATENTS

| Number | Country | Date |
|---|---|---|
| 28,774 | Germany | Sept. 18, 1884 |